United States Patent [19]
Demuro et al.

[11] Patent Number: 5,404,582
[45] Date of Patent: Apr. 4, 1995

[54] AURAL ANNUNCIATOR CIRCUIT FOR A RECEIVER

[75] Inventors: David M. Demuro, Cary; Tony A. Trandai, Skokie; William P. Alberth, Jr., Crystal Lake, all of Ill.

[73] Assignee: Motorola, Inc., Schaumburg, Ill.

[21] Appl. No.: 982,342

[22] Filed: Nov. 27, 1992

[51] Int. Cl.$^6$ ............................................. H04B 1/38
[52] U.S. Cl. ........................................ 455/90; 455/89; 455/156.1; 379/375; 379/418
[58] Field of Search ............... 455/156.1, 33.1, 54.1, 455/54.2, 89, 349, 351, 90; 379/61, 64, 372, 373, 418, 375; 340/328, 329

[56] References Cited
U.S. PATENT DOCUMENTS

| | | |
|---|---|---|
| 4,523,058 | 6/1985 | Stevens et al. .................. 379/375 X |
| 4,680,787 | 7/1987 | Marry ............................... 455/349 X |
| 4,920,557 | 4/1990 | Umemoto ......................... 379/58 X |
| 5,172,408 | 12/1992 | Petty et al. ....................... 379/375 X |
| 5,224,151 | 6/1993 | Bowen et al. ..................... 379/61 X |

Primary Examiner—Edward F. Urban
Attorney, Agent, or Firm—Randall S. Vaas

[57] ABSTRACT

An aural annunciator circuit for a radio receiver and a radio transceiver incorporating such. The annunciator circuit is operative to generate an aural signal when a signal is transmitted to the receiver in a manner analogous to telephonic ringer circuitry of conventional telephonic apparatus. The aural signal is of a signal level of a relatively high magnitude when the receiver in which the aural annunciator circuit is embodied is configured in a closed configuration and the aural signal is of a relatively low magnitude when the receiver is configured in an open configuration.

24 Claims, 4 Drawing Sheets

| VOLUME STEP | SWITCH POSITION 1 | SWITCH POSITION 2 |
|---|---|---|
| 1 | 0dB | −4dB |
| 2 | −4dB | −4dB |
| 3 | −8dB | −8dB |
| 4 | −12dB | −12dB |
| 5 | −16dB | −16dB |

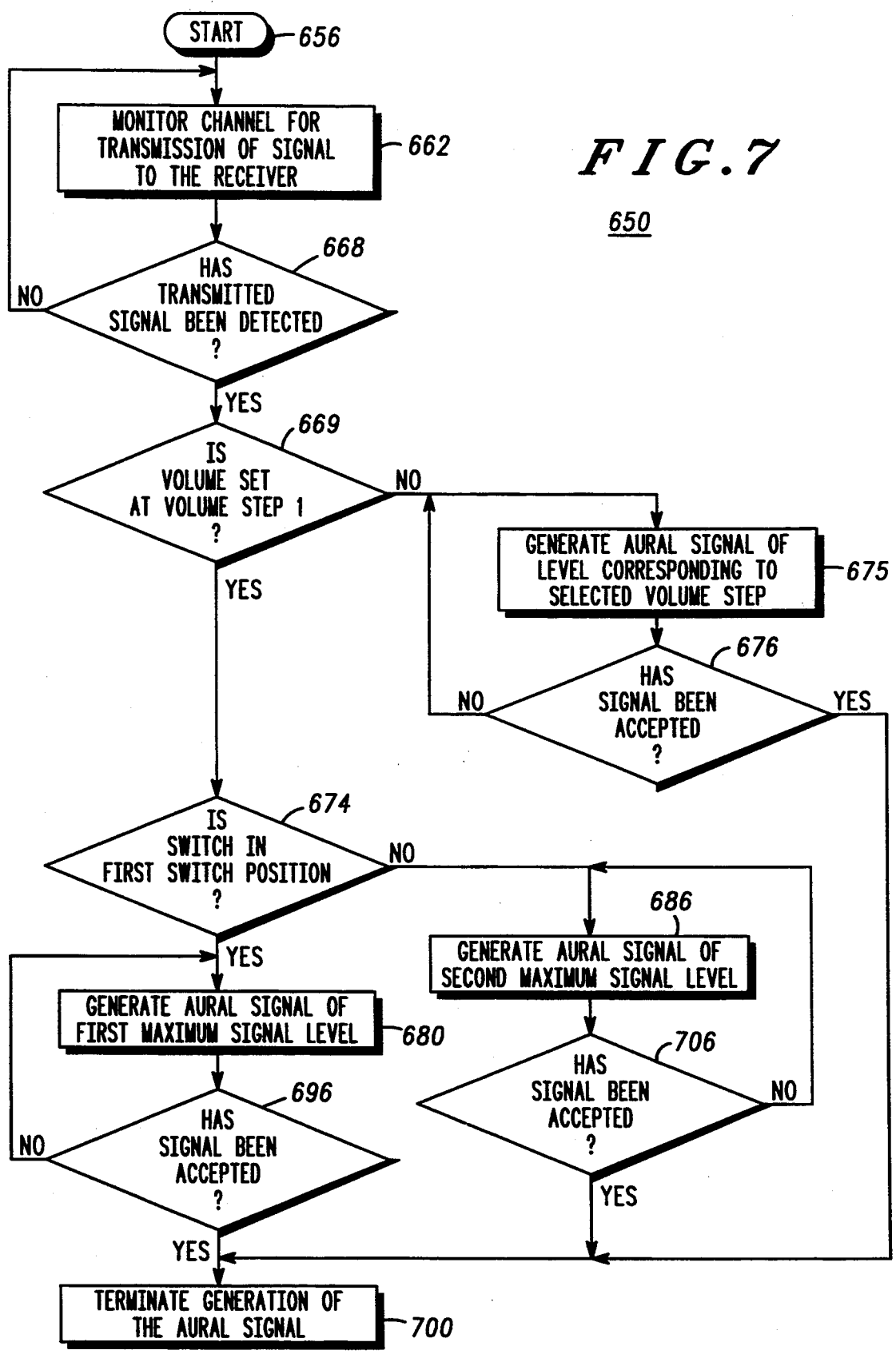

AURAL ANNUNCIATOR CIRCUIT FOR A RECEIVER

BACKGROUND OF THE INVENTION

The present invention relates generally to receivers, and, more particularly, to an aural annunciator circuit for a receiver, such as a radio receiver portion of a radio transceiver.

A communication system is comprised, at a minimum, of a receiver and a transmitter interconnected by a communication channel. The transmitter of the communication system is operative to transmit a signal upon the communication channel, and the receiver is operative to receive the signal transmitted upon the communication channel.

A radio communication system is a communication system in which the communication channel is comprised of a radio frequency channel. A radio frequency channel is defined by a range of frequencies of the communication spectrum.

The transmitter which forms a portion of the radio communication system includes circuitry for converting information into a signal of a form permitting transmission thereof upon the radio frequency channel. Such circuitry includes modulation circuitry which performs a process referred to as modulation. In such modulation process, information to be transmitted upon the radio frequency channel is impressed upon a radio frequency electromagnetic wave; the radio frequency electromagnetic wave is commonly referred to as a carrier signal. The resultant signal, formed of the combination of the carrier signal and the information, is commonly referred to as a modulated signal. Such resultant signal is also referred to as a communication signal as the modulated signal includes the information which is to be communicated by the transmitter to the receiver.

Radio communication systems are advantageous in that the transmission channel, comprised of the radio frequency channel, does not require any physical interconnection between the transmitter and the receiver. Information, once modulated to form the modulated signal, may be transmitted over large distances.

A two-way communication system is a communication system, similar to that above-described, but which further permits transmission and reception of information at two or more locations. Each location of such two-way communication system contains both a transmitter and a receiver. A two-way radio communication system is a radio communication system similar to that above-described, but which similarly permits both transmission and reception of information at the two or more locations.

In the two-way radio communication system, the transmitter and the receiver positioned at a single location typically comprise a single unit referred to as a radio transceiver, or, more simply, a transceiver. A transceiver capable of simultaneous operation both to transmit and to receive a communication signal is referred to as being capable of full duplex operation.

Cellular radiotelephones and cordless phones are two examples of consumer products comprised of radio transceivers. (Cordless phones are also sometimes referred to as "patio" phones.) Both cellular radiotelephones and cordless phones are advantageously utilized to permit users thereof to communicate therethrough with a user of conventional, telephonic apparatus of a conventional, wireline telephonic network. Because no physical interconnection is required between a cellular or cordless phone and the conventional, telephonic apparatus of a wireline network, such phones permit increased convenience of communication in some instances, and, in other instances, permit communication in instances in which communication would otherwise not be possible.

Cellular and cordless phones are constructed to be operative in manners similar to the conventional telephonic apparatus of the conventional, wireline network. That is to say, both cellular and cordless phones typically include handsets of dimensions at least similar to corresponding dimensions of handset portions of conventional telephonic apparatus. Also, the handsets of cellular and cordless phones also include both speaker portions and microphone portions for conversion of received signals into aural signals and conversion of aural signals into signals suitable for transmission, respectively.

However, because the handsets of cordless phones and the handsets of many constructions of cellular radiotelephones are actually radio transceivers, the handsets of such cellular and cordless phones also include both transmitter and receiver circuitry. As the cellular and cordless phones are operable in manners similar to operation of conventional telephones, cellular and cordless phones oftentimes include annunciator circuitry housed within the handsets thereof to indicate times when a communication signal is transmitted to the cellular or cordless phone.

Operable in manners similar to the operation of a conventional ringer assembly of conventional telephonic apparatus, the annunciator circuitry of the cellular or cordless phone handset is operative to generate an intermittent, aural signal imitative of the ringing of the ringer assembly of the conventional telephonic apparatus. The aural signal generated by the annunciator circuitry housed within the handset housing of the cellular or cordless phone must be of a signal magnitude great enough to provide adequate annunciation of the received signal. That is to say, the volume of the aural signal generated by the annunciator circuitry must be great enough to be noticeable. Because the annunciator circuitry is contained in the handset assembly, the signal level, while of a suitable level when positioned away from a potential user of the cellular or cordless phone may be of an unpleasantly high volume level when the handset is positioned proximate to an ear of such user.

Annunciator circuitry, carried with the handset of the cellular or cordless phone and operable to generate an aural annunciation signal alternately of a normal signal level when the handset of the cellular or cordless phone is likely to be positioned away from the user or of a reduced signal level when the handset of the cellular or cordless phone is likely to be positioned proximate to a user would be advantageous.

SUMMARY OF THE INVENTION

The present invention, accordingly, advantageously provides annunciator circuitry for indicating times when a signal is transmitted to a receiver.

The present invention further advantageously provides an aural annunciator circuit which generates an aural signal alternately of a first maximum signal level or of a second maximum signal level.

The present invention includes further advantages and features, the details of which will become more apparent by reading the following detailed description of the preferred embodiments.

In accordance with the present invention, therefore, an aural annunciator circuit for indicating times when a signal is transmitted to a receiver is disclosed. The receiver has receiver circuitry housed within a housing comprised of a first housing portion and a second housing portion hingedly connected theretogether. Detection is made at times when the signal is transmitted to the receiver. A receiver-configuration switch is actuatable into a first switch position when the receiver is configured in a first receiver position and is actuatable into a second switch position when the receiver is configured in a second receiver configuration. A aural signal of a first maximum signal level is generated when transmission of the signal to the receiver is detected and the receiver-configuration switch is positioned in the first switch position. The aural signal is generated to be of a second maximum signal level when transmission of the signal to the receiver is detected and the receiver-configuration switch is positioned in the second switch position.

BRIEF DESCRIPTION OF THE DRAWINGS

The present invention will be better understood when read in light of the accompanying drawings in which:

FIG. 7 is an algorithm listing a preferred method of the present invention.

DESCRIPTION OF THE PREFERRED EMBODIMENTS

Figure 1:
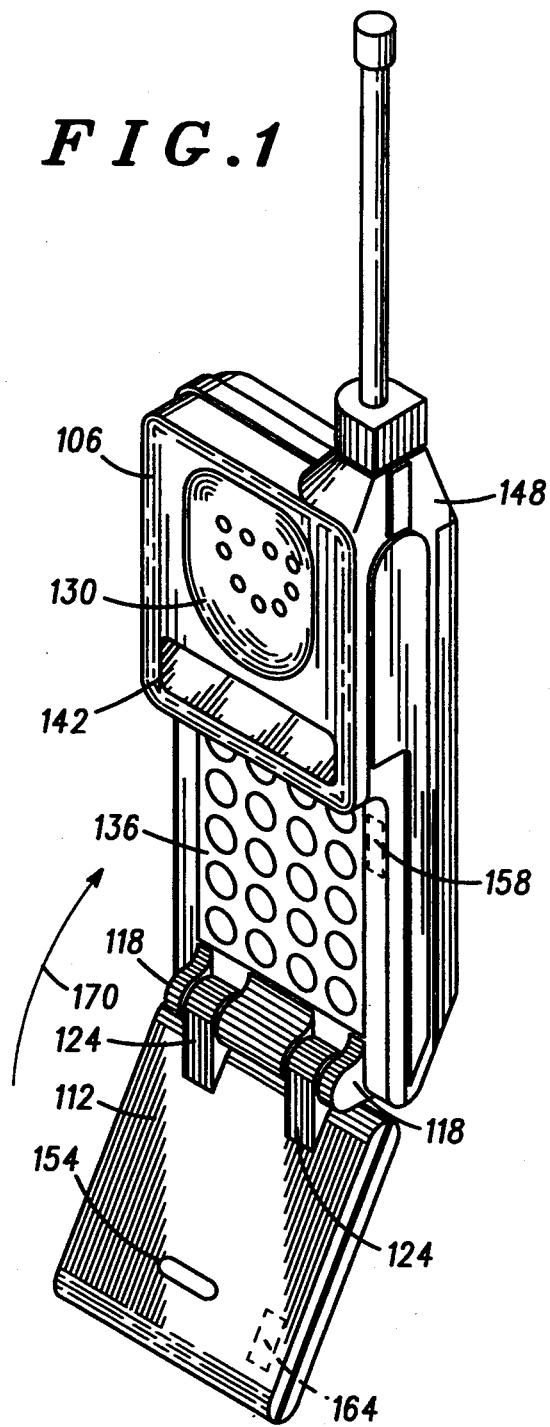
FIG. 1 is a perspective view of a radio transceiver of a preferred embodiment of the present invention which includes annunciator circuitry of the present invention illustrating the radio transceiver positioned in an open-radio configuration.

Referring first to the perspective view of FIG. 1, a radio transceiver, referred to generally by reference numeral 100, of a preferred embodiment of the present invention is shown. Radio transceiver 100 includes transmitter circuitry and receiver circuitry operable to transmit and to receive radio frequency signals. The circuitry of radio transceiver 100 may be of a design, for example, to form a cellular radiotelephone or, alternately, a cordless phone. Transceiver 100 is formed of first housing portion 106 and second housing portion 112. Housing portions 106 and 112 are hingedly connected theretogether by a hinge pin (hidden from view in the figure) by way of hinge arms 118 and 124 extending beyond the first and second housing portions 106 and 112, respectively. Relative pivotal movement of the first and second housing portions 106 and 112 is permitted about the hinge connection formed between the two housing portions.

First housing portion 106 supports speaker assembly 130 positioned at a face surface of the housing portion. Keypad interface 136 and light emitting diode 142 are also positioned at the face surface of housing portion 106. Battery pack 148 is mounted upon a rear face surface of housing portion 106 to be carried therewith. Battery pack 148 is coupled to the electrical circuitry of transceiver 100 to power the circuitry with energy stored by battery pack 148.

Microphone 154 is positioned at a face surface of second housing portion 112. Microphone 154 is electrically connected to transceiver circuitry housed within housing portion 106 of the transceiver. Speaker assembly 130 and microphone 154 are spaced apart by distances corresponding to distances separating a speaker and microphone portion of a handset of conventional telephonic apparatus.

A magnetic reed switch 158, represented in the figure by a block shown in hatch, is supported within housing portion 106. The reed switch 158 is a two-pole switch and is actuatable between first and second switch positions responsive to a moving magnetic field applied to the switch.

Magnet 164 is supported within second housing portion 112 and is represented in the figure by a block, shown in hatch. Reed switch 158 and magnet 164 are supported at locations along the respective housing portions 106 and 112 such that, when second housing portion 112 is pivoted about the hinged connection with first housing portion 106 in a direction indicated by arrow 170, a face surface of second housing portion 112 abuts against a face surface of housing portion 106 in a tandem relationship. When rotated into such position, magnet 164 is positioned proximate to reed switch 158.

Rotation of second housing portion 112 into the position whereat the face surfaces of housing portions 106 and 112 abut against each other causes corresponding rotation of magnet 164. When magnet 164 is rotated into the position proximate to reed switch 158, the magnetic field exerted by magnet 164 causes actuation of reed switch 158. Analogously, when first and second housing portions 106 and 112 are initially positioned in the abutting face-to-face relationship, and second housing portion 106 is thereafter rotated in a direction reverse to that of arrow 170, the removal of the magnetic force exerted by magnet 164 again causes actuation of read switch 158. It should, of course, be understood that other types of switches may be used in substitution for magnetic reed switch 158. For instance, and without way of limitation, a Hall effect sensor may alternately be used to perform the functions of magnetic reed switch 158.

When radio transceiver 100 is positioned, as illustrated in FIG. 1, in a configuration in which second housing portion 106 extends at an angle beyond first housing portion 106, the transceiver shall hereinafter be referred to as being in the "open position."

Figure 2:
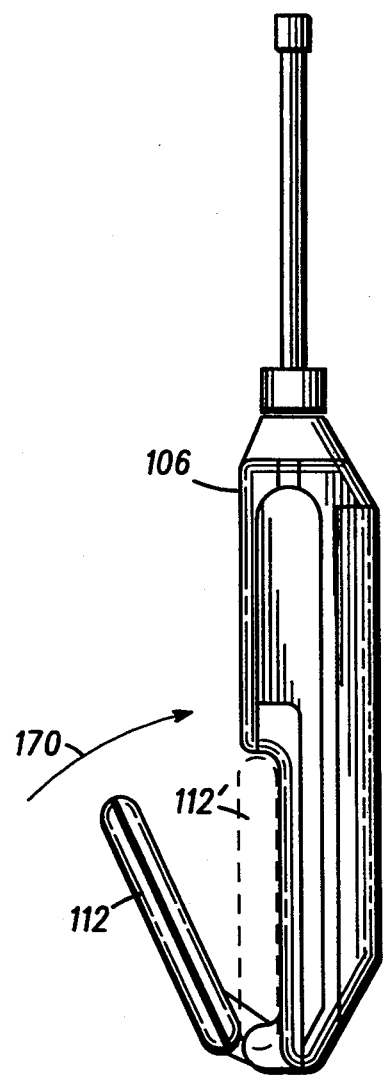
FIG. 2 is a side, elevational view of the radio transceiver of FIG. 1 as the transceiver is rotated into a closed-transceiver configuration.

FIG. 2 is a side, elevational view of transceiver 100. In the view of FIG. 2, however, second housing portion 112 is rotated about the hinged connection with first housing portion 106 towards the position in which a face surface of second housing portion 112 abuts against a face surface of first housing portion 106. Continued rotation of second housing portion 112 is permitted until the face surface of second housing surface 112 abuts against the face surface of first housing portion 106 in the abutting face-to-face relationship therewith. Such positioning of the second housing portion 112 relative to first housing portion 106 is represented in the figure by the hatch lines designated by reference numeral 112'.

When radiotelephone 100 is positioned, as illustrated by the relationship between first housing portion 106 and second housing portion 112' of FIG. 2, in a configuration in which the second housing portion is positioned in the abutting relationship against a face surface of first housing portion 106, the transceiver shall hereinafter be referred to as being in the "closed position."

It should be noted that, when transceiver 100 is positioned in the open position, a user of the transceiver may operate the transceiver to transmit and to receive communication signals. The length of transceiver 100, when positioned in the open position, permits the user to speak into microphone 154 and to listen to signals generated by speaker assembly 130 in a manner corresponding to operation of a handset of conventional telephonic apparatus (i.e., an active communication state). Conversely, when transceiver 100 is positioned in the closed position, the transceiver is positioned for carriage and storage (i.e., an active communication state). When transceiver 100 is positioned in the closed position, second housing portion 112 supportively covers actuation switches of keypad interface 136 to prevent inadvertent actuation of any of the actuation keys thereof. Typically, therefore, when radio transceiver 100 is not in use, the transceiver is positioned in the closed configuration.

Accordingly, prior to transmission of a signal to transceiver 100, transceiver 100 is typically positioned in the closed configuration shown in FIG. 2. When a signal is transmitted to transceiver 100, annunciator circuitry of the transceiver generates a signal indicating the transmission of a signal to the transceiver. The annunciator circuitry is typically operative to generate a signal analogous to the intermittent ringing signal generated by corresponding circuitry of conventional telephonic apparatus.

Responsive to such a signal, a user of transceiver 100 rotates second housing portion 112 in a direction opposite to that of arrow 170 of FIG. 1 to position transceiver 100 in the open configuration of FIG. 1. Existing transceivers of constructions corresponding to transceiver 100 are operative to "turn-on" in a manner analogous to placing conventional, telephonic apparatus in an "off-hook" condition when transceiver 100 is configured out of the dosed configuration and into the open configuration. Thereafter, a user of transceiver 100 may communicate therethrough in a manner analogous to communication through a handset of conventional telephonic apparatus.

Reed switch 158, actuatable by magnet 164, is utilized to provide an indication of the configuration in which transceiver 100 is positioned. Actuation of switch 158 as transceiver 100 is configured out of the dosed configuration and into the open configuration is utilized by the circuitry of transceiver 100 to turn-on the transceiver thereby to permit a user of transceiver 100 to communicate therethrough.

When transceiver 100 is not being utilized to communicate therethrough, the transceiver is typically configured in the closed configuration in which the transceiver may be more conveniently carried. In such configuration, it is generally desirable to generate an aural signal of a relatively high signal level to indicate times when a signal is transmitted to the transceiver as the transceiver is generally not positioned proximate to an ear of a user when the transceiver is configured in the closed configuration. An aural signal generated of the relatively high signal level is advantageous, of course, for the reason that the aural signal is more noticeable.

When transceiver 100 is configured in the open configuration, conversely, the transceiver is more likely to be positioned in closer proximity to the user even when the transceiver is not being utilized to communicate therethrough. (For instance, the user may be simulating operation of the transceiver for purposes of demonstration.) An aural signal generated by the annunciator circuitry when the transceiver is positioned in close proximity to the user may, as previously noted, be of an unpleasantly loud volume. Because reed switch 158 is operative to provide an indication of times when the transceiver is in the open configuration and, alternately, in the closed configuration, the switch position of read switch 158 may be utilized to cause the annunciator circuitry of the transceiver to generate an aural signal of differing signal level magnitudes depending upon the configuration of the transceiver.

Namely, when transceiver 100 is configured in the closed configuration, the aural signal generated by the annunciator circuitry may be generally advantageously of a relatively high signal level magnitude, whereas, when the transceiver is configured in the open configuration, an aural signal generated by the annunciator circuitry of a lower signal level is likely to be preferable.

Figure 3:
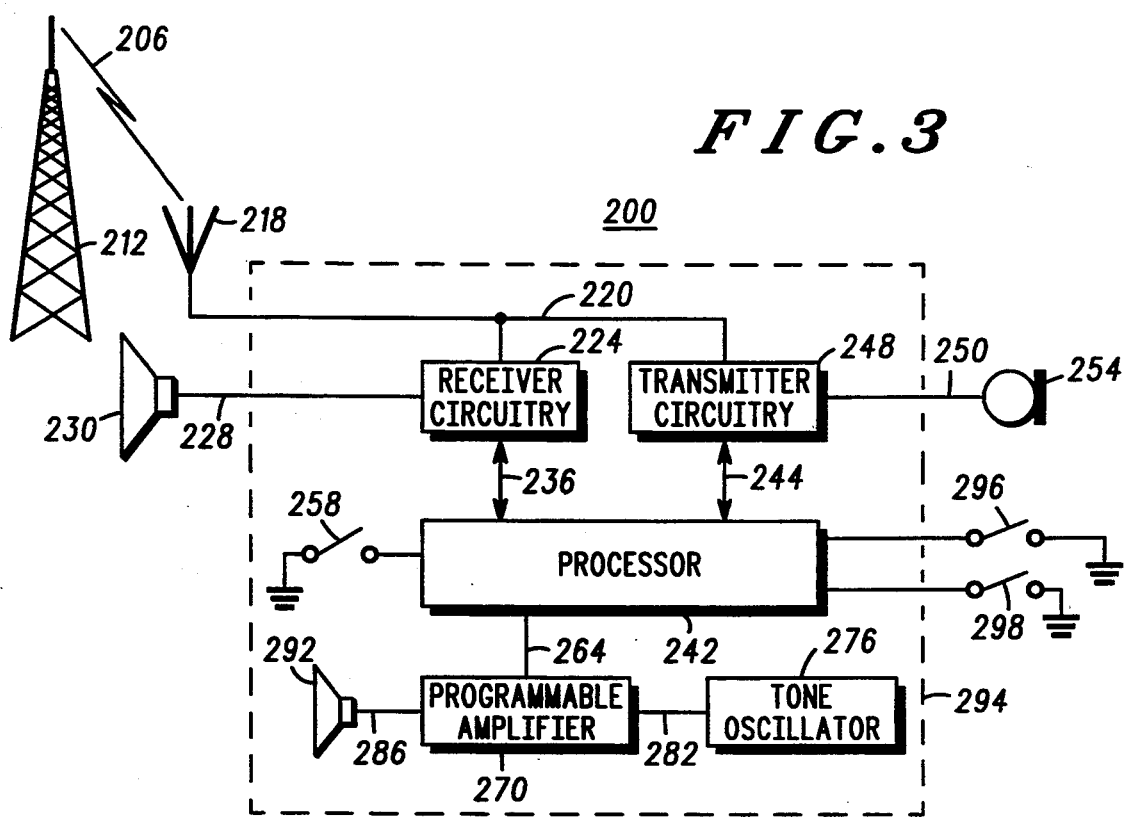
FIG. 3 is a block diagram of the annunciator circuitry of a preferred embodiment of the present invention.

Turning next to the partial block, partial circuit diagram of FIG. 3, the circuitry comprising transceiver 100, and here referred to generally by reference numeral 200, is shown. Signal 206 transmitted by transmitter 212 is received by antenna 218. Antenna 218 converts the electromagnetic wave signal received thereat into an electrical signal on line 220 which is coupled to receiver circuitry 224. Receiver circuitry 224 includes down conversion and demodulation circuitry for down-converting and demodulating the signal received by antenna 218. Once demodulated, certain of the signals received by receiver circuitry are generated on line 228 and are supplied to speaker assembly 230 which corresponds to speaker assembly 130 of FIG. 1.

Receiver circuitry 224 is further coupled, by way of line 236 with processor 242. Line 236 is, as illustrated, a two-way line permitting information to be transferred between receiver circuitry 224 and processor 242. Processor 242 is also coupled, by way of line 244, with transmitter circuitry 248.

Transmitter circuitry 248 is also coupled, by way of line 250, with microphone 254 and, also, to antenna 218, by way of line 220. A signal applied to microphone 254 is converted into an electrical signal on line 250 which, when applied to transmitter circuitry 248, is up-converted in frequency and modulated to permit thereby transmission of a modulated signal by antenna 218.

It should be noted that receiver circuitry 224, processor 242 and transmitter circuitry 248 are oftentimes collectively referred to as the transceiver circuitry of a transceiver. As processor 242 is operative, at least in part, to control operation of receiver circuitry 224 and also transmitter circuitry 248, processor 242 is sometimes represented to form portions, alternately, of receiver and transmitter circuitry 224 and 248, respectively.

Switch 258 is coupled to an input of processor 242. Switch 258 corresponds to reed switch 158 of transceiver 100 of FIG. 1. An indication of the switch position of switch 258, here illustrated to be in either a closed position or an open position, is provided to processor 242. Hence, processor 242 is provided indications of times when the transceiver is configured in the open or closed configurations as switch 258 is positioned in a first switch position (e.g., a closed switch position) when the transceiver is positioned in the closed configuration and is positioned in a second switch position (e.g., an open switch position) when the transceiver is positioned in the open configuration.

Processor 242 is also coupled by way of line 264 to programmable amplifier 270. The value of the signal generated by processor 242 on line 264 is operative to control the gain of the amplifier. Amplifier 270 is further supplied with an oscillating signal generated by tone oscillator 276 by way of line 282. (Tone oscillator 276 may include circuitry to cause the signal generated thereat to be generated only intermittently, analogous to the intermittent generation of a ringing signal of ringer circuitry of conventional, telephonic apparatus. Additionally, tone oscillator 276 may actually be comprised of two or more tone oscillators, each of which generates a tone which is thereafter combined.) The oscillating signal supplied on line 282 to programmable amplifier 270 forms the input signal to amplifier 270. Such input signal is amplified by a gain corresponding to the value of the signal applied to amplifier 270 by processor 242 by way of line 264. Amplifier 270 generates an amplified signal on line 286 which is applied to annunciator speaker 292.

When a signal transmitted to the transceiver is received at antenna 218 and supplied to receiver circuitry 224, an indication of such received signal is supplied to processor 242. Processor 242, in turn, generates a signal on line 264 to cause the gain of programmable amplifier 270 to be great enough to cause an output signal to be generated by the amplifier 270 and applied to annunciator speaker 292. The value of the signal generated by processor 242 on line 264 is further variable responsive to the positioning of switch 258.

When switch 258 is in a first switch position (corresponding to times transceiver 100 is configured in the closed configuration), and a signal transmitted to antenna 218 is detected by receiver circuitry 224, the value of the signal generated by processor 264 is of a level to cause the gain of programmable amplifier 270 to be of a relatively large value. The aural signal generated by annunciator speaker 292 is thereby of a relatively large magnitude.

When, conversely, switch 258 is in a second switch position (corresponding to times when transceiver 100 is configured in the open configuration), and a signal transmitted to antenna 218 is detected by receiver circuitry 224, the value of the signal generated by processor 264 to control the gain of amplifier 270 is of a relatively low value. The aural signal generated by annunciator speaker 292 is thereby of a relatively low magnitude.

The elements of transceiver circuitry positioned within block 294, shown in hatch, are collectively referred to as annunciator circuitry as such circuit elements together permit generation of an aural indication of times when a signal is transmitted to the transceiver. When a user of the transceiver accepts reception of the signal transmitted thereto (i.e., once the user "answers" the transceiver), processor 242 causes the signal to be generated on line 264 to be of a level to prevent generation of an aural signal by annunciator speaker 292. (Processor 242 may, for example, cause no signal to be generated on line 264.) As a user of the transceiver typically accepts reception of the signal transmitted to the transceiver by configuring the transceiver out of the closed configuration and into the open configuration, an indication of acceptance of reception of the transmitted signal is also indicated by actuation of switch 258.

Transceiver circuitry 200 further includes switches 296 and 298 which are also coupled to inputs of processor 242. Switches 296 and 298 are operative to control maximum signal levels of the signal level of the aural signal generated by annunciator speaker 292. First switch 296 is actuatable to increase the maximum signal levels of the signals generated by annunciator speaker 292, and second switch 298 is operative to decrease the maximum signal levels of the signal generated by annunciator 292. Hence, the value of the signal generated by processor 264 to control the gain of programmable amplifier 270 is dependent not only upon the position of switch 258, but also actuation of first and second switches 296 and 298.

Processor 242 is operative to determine the number of times in which either switch 296 or 298 is actuated and to determine the maximum value of which the signal generated on line 264 may take responsive thereto. For instance, four different maximum signal level combinations may be selected by actuating one or the other of the switches 296 and 298 a desired number of times to increase or to decrease the maximum signal level values permitted of the signal generated by annunciator speaker 292.

Figure 4:
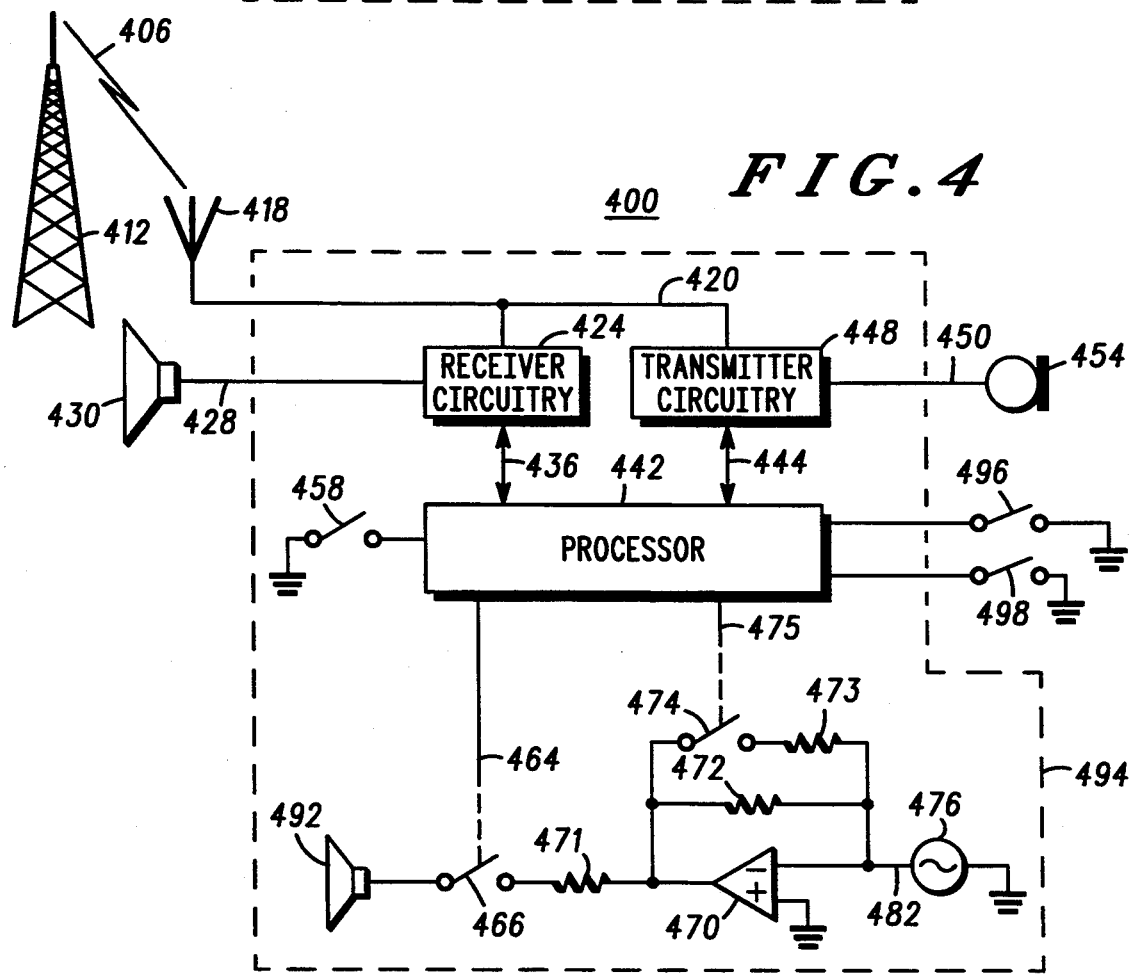
FIG. 4 is a block diagram of annunciator circuitry of an alternate, preferred embodiment of the present invention.

Turning next to the partial block, partial circuit diagram of FIG. 4, transceiver circuitry, referred to generally by reference numeral 400, of an alternate, preferred embodiment of the present invention is shown. Similar to the operation of circuitry 200 of FIG. 3, transceiver circuitry 400 of FIG. 4 is operative to receive a signal, here signal 406, transmitted by a transmitter, here transmitter 412.

Antenna 418 receives the signal transmitted thereto and converts the signal into an electrical signal on line 420 which is applied to receiver circuitry 424. Receiver circuitry 424 down-converts in frequency and demodulates the signal supplied thereto, and generates a signal on line 428 which is applied to speaker assembly 430.

Receiver circuitry 424 is coupled by way of line 436 to processor 442. Processor 442 is also coupled, by way of line 444, with transmitter circuitry 448. Transmitter circuitry is operative to modulate and to up-convert in frequency a signal supplied thereto on line 450 by microphone 454.

Switch 458, which corresponds to switches 258 and 158 of preceding figures, is applied to an input of processor 442.

Processor 442 generates a signal on line 464 responsive to times in which receiver 424 detects reception of signal 406 by antenna 418. The signal generated on line 464 is operative to control positioning of switch 466. When the signal is generated on line 464, switch 466 is actuated into a closed position; when no signal is transmitted on line 464, switch 466 is actuated into an open position.

One side of switch 466 is coupled to an output of amplifier 470 through resistor 471. Amplifier 470 is configured in a multiplier configuration with parallel-positioned feedback resistors 472 and 473. Switch 474 is positioned in series with resistor 473. When switch 474 is positioned in an open position, resistor 473 does not form a portion of the amplifier loop. Conversely, when switch 474 is positioned in a closed position, resistor 473 forms a portion of the amplifier loop. Thereby, the position of switch 474 affects the gain of the amplifier circuit. When switch 474 is in the open position, the gain of the amplifier circuit is relatively high; when switch 474 is closed, the gain of the amplifier circuit is relatively low.

A signal generated by processor 475 is operative to actuate switch 474 either into an open position or into a closed position, thereby to control the gain of the amplifier. And, processor 442 generates the signal on line 475 only during times in which switch 458 is in a first switch position. When switch 458 is in a second switch position, no signal is generated on line 475. When a signal is generated on line 475, switch 474 is actuated into an open position; when no signal is generated on line 475, switch 475 is actuated into a closed position. Thereby, when switch 458 is positioned in the first switch position, the gain of amplifier 470 is relatively high, and when switch 458 is positioned in a second switch position, the gain of amplifier 470 is relatively low.

An oscillating signal generated by tone oscillator 476 is applied by way of line 482 to a negative input of amplifier 470. (Oscillator 476, similar to oscillator 276 of transceiver circuitry 200, preferably includes circuitry to cause only intermittent generation of the oscillating signal.) When switch 466 and switch 474 are in closed positions, annunciator speaker 492, coupled to a second side of switch 466, generates an aural signal of a relatively low magnitude. When switch 466 is in the closed position and switch 474 is in an open position, annunciator speaker 492 generates an aural signal of a relatively high magnitude. And, when switch 466 is in an open position, no signal is generated by annunciator speaker 492.

Once a user of a transceiver embodying transceiver circuitry 400 accepts reception of the signal transmitted to the transceiver circuitry, a signal generated on line 464 causes actuation of switch 466 into an open position, thereby to terminate continued generation of an aural signal by annunciator speaker 492. Similar to the procedure described previously, when a user configures the transceiver out of the closed configuration and into the open configuration, the actuation of switch 458 may be utilized to cause corresponding actuation of switch 466 into an open position.

The elements enclosed within block 494, shown in hatch, form the annunciator circuitry for annunciating times when a signal is transmitted to the transceiver circuitry.

Transceiver circuitry 400 of FIG. 4 further illustrates switches 496 and 498 which correspond to switches 296 and 298 of transceiver circuitry 200 of FIG. 3. As operation of switches 496 and 498 is similar to operation of switches 296 and 298 of transceiver circuitry 200, operation of such switches shall not again be described.

Figures 5, 6:
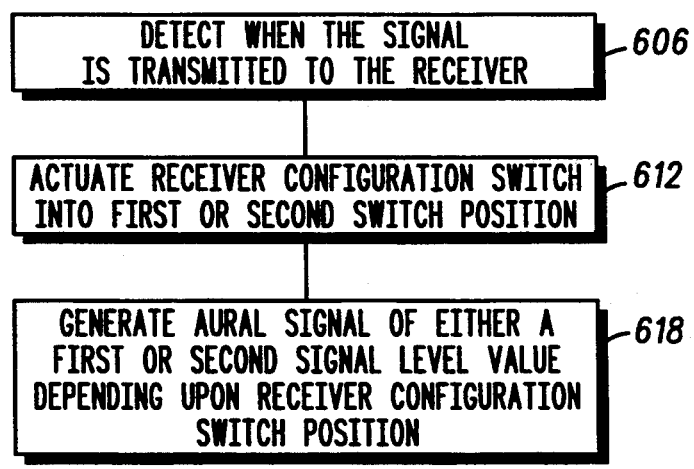
FIG. 5 is a chart listing relative signal volume levels permitted during operation of the annunciator circuitry of a preferred embodiment of the present invention.
FIG. 6 is a flow diagram listing the method stops of a preferred embodiment of the method of the present invention.

FIG. 5 is a chart of an exemplary representation of relationships between maximum signal level values of the aural signals generated by annunciator speakers 292 and 492 of transceiver circuitries 200 and 400 of FIGS. 3 and 4. In the exemplary embodiment, switch pairs 296–298 and 496–498 are actuatable to form four separate volume steps. That is to say, actuation of individual ones of switch pairs 296–298 and 496–498 permit selection of maximum signal levels of the aural signals generated by annunciator speakers 292 and 492 (as controlled by the level gain of programmable amplifier 270 and amplifier 470). Volume steps are indicated in the column at the left-hand side of the figure. A maximum volume step is represented by volume step 1, and a minimum volume step is represented by volume step 4. Columns labelled switch positions 1 and 2 represent the volume levels, in terms of decibels, of the signals generated by the annunciator circuitry when switches 158, 258, or 458 of the preceding figures are positioned in the first or second switch positions.

A default setting of volume step one, for instance, may be selected at which maximum signal levels when switches 258 and 458 are positioned in first and second switch positions are selected to be of greatest signal level values. By actuating second switches 298 and 498 a first time, second volume step shown in the chart is selected whereat maximum signal levels of signals generated by annunciator speakers 292 and 492 are somewhat reduced. Actuation of second switches 298 or 498 a second time causes selection of a third volume step whereat the maximum signal levels of the signals generated by annunciator speakers 292 or 492 are somewhat further reduced. Additional actuation of switches 296 or 496 cause a fourth volume step to be selected.

Actuation of first switches 296 or 496 causes a reverse process, that is, incremental increase of volume steps. Other numbers of volume steps, and other manners of selecting such volume steps may, of course, be alternately utilized.

FIG. 6 is a flow diagram, referred to generally by reference numeral 600, listing the method steps of the method of a preferred embodiment of the present invention. The method aurally annunciates times when a signal is transmitted to a receiver. The method includes the steps of, and as indicated by block 606, detecting when the signal is transmitted to the receiver. Next, and as indicated by block 612, a receiver configuration switch is actuated into a first switch position when the receiver is configured in a first receiver configuration, and is actuated into a second switch position when the receiver is configured in a second receiver configuration. Next, and as indicated by block 618, an aural signal of a first maximum signal level value is generated when a signal transmitted to the receiver is detected and the receiver configurations switch is positioned in a first switch position. The aural signal is of a second maximum signal level value when transmission of a signal to the receiver is detected and the receiver-configuration switch is positioned in a second switch position.

Finally turning now to the logical flow diagram of FIG. 7, an algorithm, referred to generally by reference numeral 650, of the preferred embodiment of the present invention, is shown in logical, flow diagram form. First, after entry to start block 656, and as indicated by block 662, a radio frequency channel is monitored for transmission of a signal to a receiver. Next, and as indicated by decision block 668, a determination is made as to whether a signal has been transmitted to the receiver. If no transmitted signal has been detected, the no branch is taken from decision block 668 and monitoring of the channel is continued.

If a transmitted signal has been detected, a yes branch is taken to decision block 669 whereat a determination is made as to whether the maximum volume of the annunciator circuitry, as set by the switch pairs, such as switch pairs 296–298 and 496–498, is set at volume step 1.

If so, a yes branch is taken to decision block 674. If not, the no branch is taken to block 675, and an aural signal of a level corresponding to the selected volume step is generated. Then, at decision block 676, a determination is made as to whether the signal transmitted to the receiver has been accepted for reception. If so, the yes branch is taken; if not, the no branch is taken and the aural signal is continued to be generated.

If the yes branch is taken from decision block 669 to decision block 674, a determination is made as to whether the receiver-configuration switch (such as switches 158, 258 or 458 of the preceding figures) is positioned in a first switch position. (The receiver-configuration is positioned in the first switch position when the transceiver is configured in the closed configuration.) If the switch is in the first switch position, the yes branch is taken and an aural signal of a first maximum signal level is generated, as indicated by block 680. If the switch is not in the first switch position the no branch is taken and the aural signal of the second maximum signal level is generated, as indicated by block 686.

If the yes branch is taken from decision block 674, and the aural signal of the first maximum signal level is generated, a determination is then made, as indicated by decision block 696 as to whether the signal transmitted to the receiver has been accepted for reception. If the signal has not been accepted for reception, the no branch is taken from decision block 696, and the aural signal of the first maximum signal level is continued to be generated. If, conversely, the signal transmitted to the receiver has been accepted for reception, the yes branch is taken from decision block 696 and generation of the aural signal is terminated.

If the no branch has been taken from decision block 674 and the aural signal is generated to be of the second maximum signal level, a determination is thereafter made, as indicated by block 706 as to whether the signal transmitted to the receiver has been accepted for reception. If the signal has not been accepted for reception, the no branch is taken from decision block 706, and the aural signal is continued to be generated. If, conversely, the signal transmitted to the receiver has been accepted for reception, the yes branch is taken to block 700 and generation of the aural signal is terminated.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An apparatus having an aural annunciation circuit for indicating times when an annunciation signal is transmitted to a receiver therein, the apparatus comprising:
    a housing comprised of a first housing portion and a second housing portion movably interconnected to change from an inactive communication state in a first position and an active communication state in a second position;
    a detector positioned in the housing to detect when the annunciation signal is transmitted to the receiver;
    a configuration switch positioned in the housing and actuatable into a first switch position when the first and second housing portions are configured in the first housing position and actuatable into a second switch position when the first and second housing positions are configured in the second housing position; and
    a controller positioned in the housing to generate an aural signal of a first maximum signal level value when the detector detects transmission of the signal to the receiver and the configuration switch is positioned in the first switch position and of a second maximum signal level value when the detector detects transmission of the signal to the receiver and the configuration switch is positioned in the second switch position, the first and second maximum signal levels controllable to generate the aural signal such that the first maximum signal level is greater than the second maximum signal level.

2. The apparatus of claim 1 wherein the detector comprises processor circuitry coupled to the receiver circuitry to form a portion thereof and an algorithm executable in the processor circuitry for detecting times when the receiver circuitry receives the signal transmitted to the receiver.

3. The apparatus of claim 2 wherein the algorithm executable in the processor circuitry is further executable to cause the processor circuitry to generate a signal-received output signal during times in which the receiver circuitry receives the signal transmitted to the receiver.

4. The apparatus of claim 3 wherein the signal generator generates the aural signal responsive to times when the processor circuitry generates the signal-received output signal.

5. The apparatus of claim 4 wherein the signal generator comprises a tone oscillator for generating at least one oscillating signal of at least one selected frequency, an amplifier coupled to receive the at least one oscillating signal for generating at least one amplified oscillating signal, and a speaker coupled to the amplifier for generating an aural signal of a signal level magnitude corresponding to values of the at least one amplified oscillating signal.

6. The apparatus of claim 2 wherein the configuration switch is coupled to an input of the processor circuitry.

7. The apparatus of claim 2 wherein the first maximum signal level value is of a magnitude greater than the second maximum signal level value.

8. The apparatus of claim 7 wherein the aural signal generated by the signal generator when the detector detects transmission of the signal to the receiver and the switch is positioned in the first switch position is of a signal level value of a first range of signal level values wherein the first range of signal level values includes a first-range maximum signal level value of a value no greater than the first maximum signal level value.

9. The apparatus of claim 8 wherein the aural signal generated by the signal generator when the signal detector detects transmission of the signal to the receiver and the switch is positioned in the second switch position is of a signal level value of a second range of signal level values wherein the second range of signal level values includes a second-range maximum signal level value of a value no greater than the second maximum signal level value.

10. The apparatus of claim 9 further comprising a selector selecting values of the first and second ranges of signal level values, respectively, of which the aural signal generated by the the signal generator may take.

11. The apparatus of claim 10 wherein the selector comprises at least one signal-level-magnitude selection switch coupled to an input of the processor circuitry.

12. The apparatus of claim 11 wherein the algorithm executable in the processor circuitry is further executable to cause the processor to generate a volume control output signal responsive to positioning of the signal-level-magnitude selection switch and positioning of the receiver-configuration switch.

13. The apparatus of claim 11 wherein the generator comprises a tone oscillator for generating an oscillating signal of a selected frequency, an amplifier coupled to receive the oscillating signal for generating an amplified, oscillating signal, and a speaker coupled to the amplifier for generating an aural signal of a signal level magnitude corresponding to values of the amplified, oscillating signal.

14. The apparatus of claim 13 wherein the volume control output signal generated by the processor circuitry is applied to the amplifier to vary the gain thereof responsive to values of the volume control output signal.

15. The apparatus of claim 1 wherein the first receiver position into which the receiver is configured to actuate the receiver-configuration switch into the first switch position comprises a closed housing configuration in which a face surface of the second housing is tandemly positioned in a face-to-face relationship with a face surface of the first housing.

16. An aural annunciator circuit for indicating times when a signal is transmitted to a receiver having receiver circuitry housed within a housing comprised of a first housing portion and a second housing portion connected there together, the annunciator circuit comprising:
- means for detecting when the signal is transmitted to the receiver;
- a receiver-configuration switch actuatable into a first switch position when the receiver is configured in a first receiver position and actuatable into a second switch position when the receiver is configured in a second receiver configuration; and
- means for generating an aural signal of a first maximum signal level value when the means for detecting detects transmission of the signal to the receiver and the receiver-configuration switch is positioned in the first switch position and of a second maximum signal level value when the means for detecting detects transmission of the signal to the receiver and the receiver-configuration switch is positioned in the second switch position;
- wherein the first receiver position into which the receiver is configured to actuate the receiver-configuration switch into the first switch position comprises a closed-receiver configuration in which a face surface of the second housing portion is tandemly positioned in a face-to-face relationship with a face surface of the first housing portion.

17. The annunciator circuit of claim 16 wherein the second receiver position into which the receiver is configured to actuate the receiver-configuration switch into the second switch position comprises an open-receiver configuration in which the second housing portion extends beyond the first housing portion at an angle relative thereto.

18. The annunciator circuit of claim 17 wherein the receiver-configuration switch comprises a magnetic reed switch.

19. The annunciator circuit of claim 18 wherein the magnetic reed switch comprising the receiver-configuration switch is positioned at the first housing portion.

20. The annunciator circuit of claim 18 further comprising a magnet positioned at the second housing portion, the magnet operative to generate a magnetic field alternately:
- to actuate the magnetic reed switch out of the first switch position and into the second switch position when the receiver is configured out of the closed-receiver configuration and into the open-receiver configuration; or
- to actuate the magnetic reed switch out of the second switch position and into the first switch position when the receiver is configured out of the open-receiver configuration and into the closed-receiver configuration.

21. A method of controlling the volume of an audible signal aurally annunciating times when a signal is transmitted to a receiver, the receiver positioned in a housing having movably interconnected housing portions and a switch which is configured in a first position when the housing portions are closed and a second position when the housing portions are open, the method comprising the steps of:
- detecting when the signal is transmitted to the receiver;
- generating an aural signal of a first maximum signal level value when the signal transmitted to the receiver is detected during the step of detecting and the receiver-configuration switch is positioned in the first switch position; and
- generating an aural signal of a second maximum signal level value when the signal transmitted to the receiver is detected during the step of detecting and the receiver-configuration switch is positioned in the second switch position, the second maximum signal level controllable to be smaller than the first maximum signal level.

22. An apparatus having an aural annunciator circuit for indicating times when a signal is transmitted to a receiver therein, the apparatus comprising:
- a housing having an open position and a closed position, the receiver positioned in the housing;
- a detector positioned in the housing to detect when an annunciation signal is transmitted to the receiver;
- a configuration switch positioned in the housing and actuated into a first switch position when the apparatus is in the closed position and actuated into a second switch position when the apparatus is in the open state; and
- a controller positioned in the housing to generate an aural signal of a first maximum signal level value when the detector detects transmission of the signal to the receiver and the configuration switch is positioned in the first switch position and of a second maximum signal level value when the detector detects transmission of the signal to the receiver and the configuration switch is positioned in the second switch position, wherein the first and second maximum levels are controllable such the first maximum signal level is greater than the second maximum signal level.

23. The apparatus of claim 22, wherein the housing includes first and second housing portions which are movably interconnected.

24. The apparatus of claim 23 wherein the first receiver position into which the receiver is configured to actuate the receiver-configuration switch into the first switch position comprises a closed housing configuration in which a face surface of the second housing is tandemly positioned in a face-to-face relationship with a face surface of the first housing.

* * * * *